United States Patent
Zähe et al.

(10) Patent No.: US 11,009,896 B2
(45) Date of Patent: *May 18, 2021

(54) PROPORATIONAL FLOW CONTROL VALVE AND PILOT-OPERATED CHECK VALVE INTEGRATED THEREWITH

(71) Applicant: Sun Hydraulics, LLC, Sarasota, FL (US)

(72) Inventors: Bernd Zähe, Sarasota, FL (US); Andy Borja, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/502,249

(22) Filed: Jul. 3, 2019

(65) Prior Publication Data
US 2021/0004026 A1    Jan. 7, 2021

(51) Int. Cl.
*G05D 7/06*      (2006.01)
*F16K 31/42*    (2006.01)
*F16K 11/07*    (2006.01)

(52) U.S. Cl.
CPC ............ *G05D 7/0635* (2013.01); *F16K 11/07* (2013.01); *F16K 31/426* (2013.01)

(58) Field of Classification Search
CPC ..... G05D 7/0635; F16K 31/426; F16K 11/07; F15B 1/00
See application file for complete search history.

(56) References Cited

U.S. PATENT DOCUMENTS

| 6,527,010 | B1 * | 3/2003 | Watson | E21B 34/04 137/625.63 |
| 8,757,208 | B2 * | 6/2014 | Dornbach | F16K 31/426 137/625.61 |
| 9,850,919 | B2 * | 12/2017 | Zaehe | G05D 16/10 |
| 10,437,269 | B1 * | 10/2019 | Zahe | F15B 13/024 |
| 10,794,510 | B1 * | 10/2020 | Pena | F16K 31/408 |
| 2006/0201554 | A1 * | 9/2006 | Prinsen | F16K 17/0433 137/491 |
| 2016/0091101 | A1 * | 3/2016 | Neubauer | F16K 31/406 137/625.18 |
| 2020/0393855 | A1 * | 12/2020 | Zahe | F16K 31/423 |

* cited by examiner

*Primary Examiner* — Michael R Reid
(74) *Attorney, Agent, or Firm* — McDonnell Boehnen Hulbert & Berghoff LLP

(57) ABSTRACT

An example valve includes: a first port fluidly coupled to a chamber of an actuator; a second port fluidly coupled to a reservoir; a third port configured to provide an output pilot fluid signal and receive an input pilot fluid signal; a fourth port fluidly coupled to a source of fluid; a main poppet configured to be subjected to a first fluid force of fluid received at the first port acting on the main poppet in a proximal direction to cause the main poppet to be seated at a main poppet seat to block fluid flow to and from the first port; a piston configured to move axially to contact the main poppet; and a spool that is axially movable between a first position and a second position to operate the valve in either a pilot-operated check valve mode of operation or a proportional flow control mode of operation.

20 Claims, 5 Drawing Sheets

PROPORATIONAL FLOW CONTROL VALVE AND PILOT-OPERATED CHECK VALVE INTEGRATED THEREWITH

BACKGROUND

A meter-in valve can be configured to control fluid flow to an actuator in a hydraulic system in such a manner that there is a restriction in the amount of fluid flowing to the actuator. The meter-in valve can be actuated electrically, mechanically, pneumatically, hydraulically, or manually.

A pilot-operated check valve can be configured as a pilot-to-open check valve. Particularly, a pilot-operated check valve can have three ports and is configured to control fluid flow between a first port and a second port based on a fluid signal received at a third port that can be referred to as a pilot port. For example, the pilot-operated check valve is configured to allow fluid flow from the second port to the first port, while blocking fluid flow in the opposite direction (i.e., from the first port to the second port). When a pressurized pilot fluid signal is received at the third port, the pilot-operated check valve can open to allow fluid flow from the first port to the second port. As such, pilot-operated check valves can lock loads in a leak-free mode and they are suited for many clamping applications or to prevent a negative load from falling down in case of hose failure.

An actuator that has two chambers can have one or more meter-in valves to control fluid flow to the chambers and pilot-operated check valves that control fluid flow out of the chambers. Additional valves (e.g., check valves) are typically added to perform additional functionalities in a hydraulic system such as providing a load-sense signal to a load-sensing pump.

Such a hydraulic system can involve many hydraulic connections between the different valves. Also, the valves can be placed in a manifold that includes complex fluid passages and ports to connect the various valves in the hydraulic system. It may thus be desirable to have a valve that reduces complexity and cost of the hydraulic system. It is with respect to these and other considerations that the disclosure made herein is presented.

SUMMARY

The present disclosure describes implementations that relate to a proportional flow control valve and pilot-operated valve integrated therewith.

In a first example implementation, the present disclosure describes a valve. The valve includes: (i) a plurality of ports comprising: (a) a first port configured to be fluidly coupled to a hydraulic actuator, (b) a second port configured to be fluidly coupled to a reservoir, (c) a third port configured to provide an output pilot fluid signal and receive an input pilot fluid signal, and (d) a fourth port configured to be fluidly coupled to a source of fluid; (ii) a main poppet configured to be subjected to a first fluid force of fluid received at the first port acting on the main poppet in a proximal direction to cause the main poppet to be seated at a main poppet seat to block fluid flow to and from the first port; (iii) a piston configured to move axially to contact the main poppet; and (iv) a spool that is axially movable between a first position and a second position. The valve is configured to operate in two modes of operation: (i) a pilot-operated check valve mode of operation in which the spool is in the first position that allows the input pilot fluid signal to apply a second fluid force on the piston in a distal direction opposite the proximal direction, thereby causing the piston to unseat the main poppet off the main poppet seat to fluidly couple the first port to the second port, and (ii) a proportional flow control mode of operation in which the spool is subjected to fluid received at the fourth port to move the spool to the second position at which the spool blocks the second port and the main poppet is unseated off the main poppet seat, thereby causing the fourth port to be fluidly coupled to: (a) the first port to provide fluid flow thereto, and (b) the third port to provide the output pilot fluid signal to be communicated externally.

In a second example implementation, the present disclosure describes a hydraulic system including a source of fluid; a reservoir; an actuator having a first chamber and a second chamber therein; a pilot-operated valve comprising: a load port fluidly coupled to the second chamber of the actuator, and a pilot port, wherein the pilot-operated check valve is configured to allow fluid flow from the load port to the reservoir when a pilot fluid signal is received at the pilot port; and a valve comprising: a first port fluidly coupled to the first chamber of the actuator, a second port fluidly coupled to the reservoir, a third port configured to provide an output pilot fluid signal to the pilot port of the pilot-operated check valve and receive an input pilot fluid signal, and a fourth port fluidly coupled to the source of fluid. The valve further comprises: (i) a main poppet configured to be subjected to a first fluid force of fluid received at the first port acting on the main poppet in a proximal direction to cause the main poppet to be seated at a main poppet seat to block fluid flow to and from the first port; (ii) a piston configured to move axially to contact the main poppet; and (iii) a spool that is axially movable between a first position and a second position. The valve is configured to operate in two modes of operation: (i) a pilot-operated check valve mode of operation in which the spool is in the first position that allows the input pilot fluid signal to apply a second fluid force on the piston in a distal direction opposite the proximal direction, thereby causing the piston to unseat the main poppet off the main poppet seat to fluidly couple the first port to the second port, and (ii) a proportional flow control mode of operation in which the spool is subjected to fluid received at the fourth port to move the spool to the second position at which the spool blocks the second port and the main poppet is unseated off the main poppet seat, thereby causing the fourth port to be fluidly coupled to: (a) the first port to provide fluid flow to the first chamber of the actuator, and (b) the third port to provide the output pilot fluid signal to be communicated to the pilot port of the pilot-operated check valve to actuate the pilot-operated check valve and allow fluid to flow from the second chamber to the reservoir.

In a third example implementation, the present disclosure describes a method. The method includes: (i) receiving an electrical command signal energizing a solenoid coil of a valve, wherein the valve comprises: (a) a first port fluidly coupled to a chamber of an actuator, (b) a second port fluidly coupled to a reservoir, (c) a third port fluidly coupled to a pilot port of a pilot-operated check valve, (d) a fourth port fluidly coupled to a source of fluid, and (e) a spool that is axially movable between a first position and a second position; (ii) responsively, causing the spool to move from the first position to the second position to operate the valve as a meter-in valve that: (a) meters fluid received at the fourth port and provides metered fluid to the first port to be provided to the chamber of the actuator, and (b) provides an output pilot fluid signal through the third port of the valve to the pilot port of the pilot-operated check valve; (iii) receiving an input pilot fluid signal at the third port of the valve while the spool is in the first position; and (v) responsively, operating the valve as in a pilot-operated check valve mode of operation, wherein fluid received at the first port from the chamber of the actuator flows through the valve to the second port of the valve, which is fluidly coupled to the reservoir.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Figure 1:
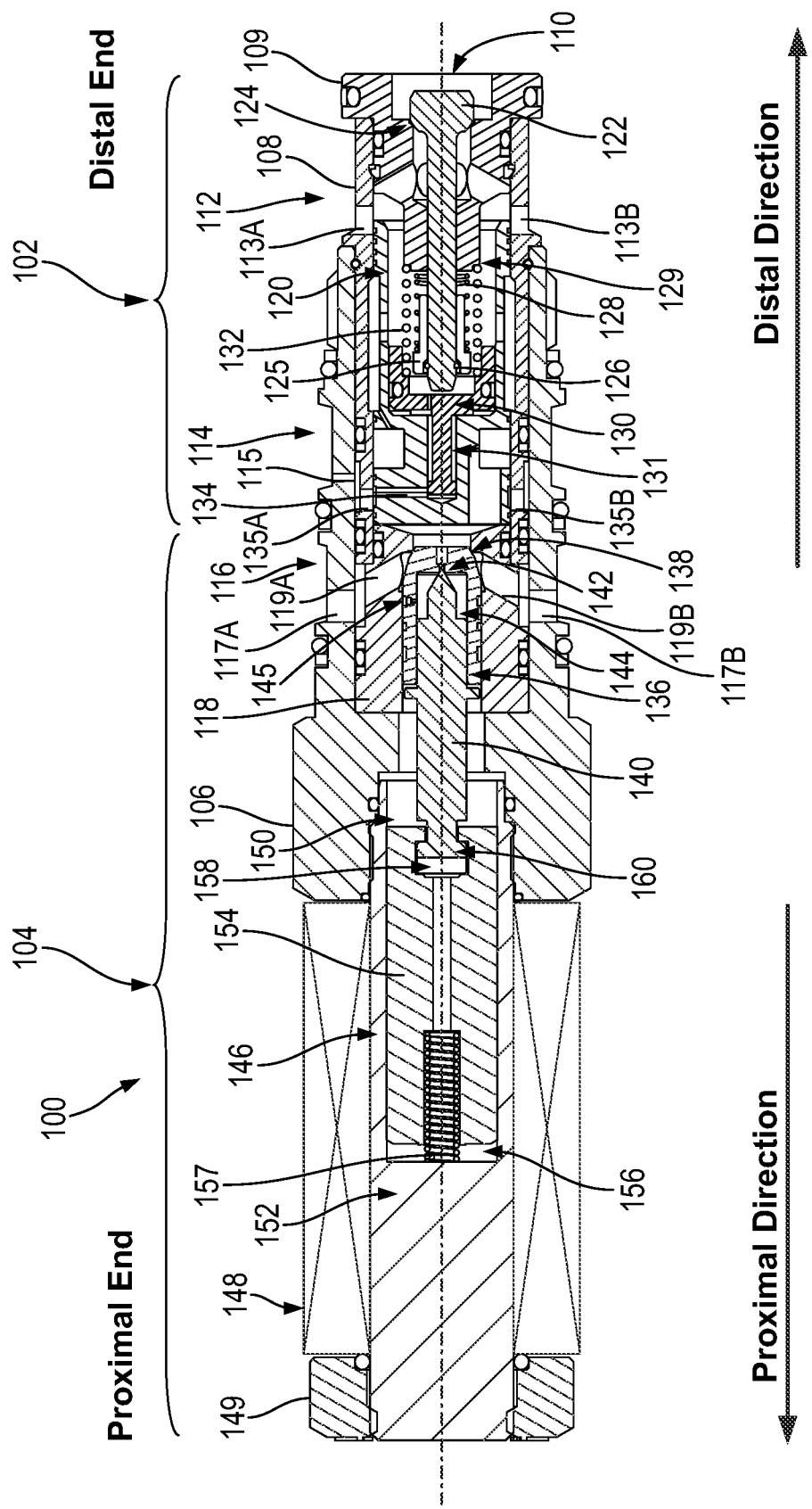
FIG. 1 illustrates a cross-sectional side view of a valve, in accordance with an example implementation.

In examples, a pilot-operated check valve can be used on the return side of a hydraulic actuator for holding a load. An example pilot-operated check valve can have three ports: a first port fluidly coupled to a first side of the actuator (e.g., rod side of a hydraulic actuator cylinder), a second port operating as an outlet port that is fluidly coupled to a tank or reservoir, and a third port that can be referred to as a pilot port. The pilot port can be fluidly coupled via a pilot line to a supply line connected to a second side of the actuator (e.g., head side of the hydraulic actuator cylinder).

The pilot-operated check valve can be configured to allow free fluid flow from the second port to the first port while blocking fluid flow in the opposite direction from the first port to the second port. When a pilot signal provided via the pilot line to the third port has a sufficiently high pressure level, the pilot-operated check valve opens and allows fluid flow from the first port to the second port.

The pilot-operated check valve can be characterized by a ratio between a first surface area on which the pilot signal acts and a second surface area on which the load pressure at the first port acts. Such ratio may be referred to as "pilot ratio." As an example for illustration, assuming the pilot ratio is 3:1, if a pilot signal at the third port has a pressure level that is 33% of load pressure level at the first port, the pilot-operated check valve opens, and fluid is allowed to flow from the first port to the second port.

Further, each side of the hydraulic actuator can be fluidly coupled to a flow control valve, i.e., meter-in valve, which controls fluid flow to the associated side of the hydraulic actuator. Thus, each side of the hydraulic actuator, i.e., the head side and the rod side, is fluidly coupled to a meter-in valve that controls fluid flow thereto and a pilot-operated check valve that controls fluid flow therefrom. In some examples, additional valves, e.g., check valves, can also be used to perform additional functionalities in the hydraulic system.

Conventional configurations can involve a meter-in valve that is separate from a pilot-operated check valve for each side and a manifold in which all the valves are disposed. Having at least three valves connected in a manifold can increase size, cost, and complexity of the manifold.

Therefore, it may be desirable to have a valve that integrates meter-in valve operations along with pilot-operated check valve operations. This way, two valves rather than three or four separate valves can be used to operate the hydraulic actuator, thereby reducing complexity, cost, and size of the manifold.

Also, it may be desirable that such valve provides direct fluid path for flow exiting the pilot-operated check valve portion of the disclosed valve to the reservoir. This way, no pressurized fluid is trapped as in conventional system and actuating a directional valve is not required to allow fluid exiting the pilot-operated check valve portion to flow to the reservoir.

Further, in some example applications that involve using a load-sensing pump, a conventional hydraulic system can include two additional check valves, one for each side of the actuator. The two check valves resolve which side has a higher pressure level and a fluid signal having the higher pressure level is provided to the pump so that the pump can supply fluid at a sufficient pressure level that can move the actuator. It is desired to have the fluid signal from the supply or meter-in side to be provided to the pump. However, in some cases, the return side may have a high pressure level, which is then provided to the pump and the pump provides fluid pressure level at a higher pressure level than is required by the supply side of the actuator, rendering the system energy-inefficient. It may thus be desirable to provide a fluid signal from the supply side regardless of the pressure level of fluid in the return line. It may also be desirable to use one check valve instead of two so as to reduce cost and complexity of the system.

FIG. 1 illustrates a cross-sectional side view of a valve 100, in accordance with an example implementation. The valve 100 may be inserted or screwed into a manifold having ports corresponding to ports of the valve 100 described below, and can thus fluidly coupled the valve 100 to other components of a hydraulic system.

The valve 100 includes a pilot-operated check valve portion 102 and a proportional flow control or meter-in valve portion 104. The valve 100 includes a housing 106 having a longitudinal cylindrical cavity therein. The longitudinal cylindrical cavity of the housing 106 is configured to house parts of the pilot-operated check valve portion 102 and the meter-in valve portion 104.

The valve 100 includes a main sleeve 108 received at a distal end of the housing 106. The valve 100 also includes a nose piece 109 received at a distal end of the main sleeve 108. The valve 100 includes a first port 110 at a nose or distal end of the nose piece 109. The first port 110 can also be referred to as a load port and is configured to be fluidly coupled to a chamber of a hydraulic actuator.

The valve 100 also includes a second port 112. The second port 112 can be referred to as a tank or reservoir port and can be configured to be fluidly coupled to a tank or reservoir of hydraulic fluid to provide return flow from the hydraulic actuator to the reservoir. The reservoir can have fluid at a low pressure level, e.g., 0-70 pounds per square inch (psi). The second port 112 can include a set of return flow cross-holes, such as return flow cross-holes 113A, 113B disposed in radial or circumferential array about the main sleeve 108. The term "hole" is used generally herein to indicate a hollow place (e.g., cavity) in a solid body or surface, for example. The term "cross-hole" indicates a hole that crosses a path of another hole, cavity, or channel.

The valve 100 also includes a third port 114. The third port 114 can be referred to as a pilot port. The third port 114 can include one or more cross-holes that can be referred to as pilot signal cross-holes, such as a pilot signal cross-hole 115 disposed in the housing 106. The pilot signal cross-hole 115 is configured to receive an input pilot fluid signal to actuate the pilot-operated check valve portion 102 of the valve 100. Further, the valve 100 is configured such that, when the meter-in valve portion 104 is actuated, an output pilot fluid signal is communicated to the pilot signal cross-hole 115 so as to provide or communicate the output pilot fluid signal externally to a pilot port of a pilot-operated check valve on the other side of the actuator.

The valve 100 further includes a fourth port 116. The fourth port 116 can be referred to as an inlet port and is configured to be coupled to a source of fluid (e.g., a pump, an accumulator, etc.) capable of providing fluid at high pressure levels (e.g., 1000-5000 psi). The fourth port 116 can include a set of cross-holes that can be referred to as inlet flow cross-holes, such as inlet flow cross-holes 117A, 117B, disposed in a radial or circumferential array about the housing 106.

The valve 100 also includes a second sleeve 118 disposed adjacent to the spool 120 and the main sleeve 108 within the housing 106. The second sleeve 118 is restrained from moving by resting against a proximal end of the main sleeve 108. The second sleeve 118 includes a respective set of cross-holes, such as cross-holes 119A, 119B, disposed in a radial array about the second sleeve 118. The cross-holes 119A, 119B of the second sleeve 118 are respectively fluidly coupled to the inlet flow cross-holes 117A, 117B via an undercut or annular groove disposed in an exterior peripheral surface of the second sleeve 118 as depicted in FIG. 1.

The main sleeve 108 includes a respective longitudinal cylindrical cavity therein. The valve 100 includes a spool 120 that is disposed, and slidably accommodated, in the longitudinal cylindrical cavity of the main sleeve 108. The terms "spool" and "piston" are used herein to encompass any type of movable element.

Further, the term "slidably accommodated" is used throughout herein to indicate that a first component (e.g., the spool 120) is positioned relative to a second component (e.g., the main sleeve 108) with sufficient clearance therebetween, enabling movement of the first component relative to the second component in the proximal and distal directions. As such, the first component (e.g., spool 120) is not stationary, locked, or fixedly disposed in the valve 100, but rather, is allowed to move relative to the second component (e.g., the main sleeve 108).

The valve 100 further includes a main poppet 122 slidably accommodated within the nose piece 109. When the valve 100 is unactuated (i.e., when the valve 100 precludes fluid flow to and from the first port 110), the main poppet 122 is configured to be seated at a main poppet seat 124 formed by an interior surface of the nose piece 109. The valve 100 is shown in FIG. 1 with the main poppet 122 being seated at the main poppet seat 124, thereby blocking a fluid path to and from the first port 110. The term "block" is used throughout herein to indicate substantially preventing fluid flow except for minimal or leakage flow of drops per minute, for example. As such, in this position, the fluid provided to the first port 110 from an actuator is not allowed to flow through the valve 100, and thus the load coupled to the actuator is held in-position and is precluded from moving.

The valve 100 further includes a spring support member 125 disposed about an exterior peripheral surface of the main poppet 122 at a proximal portion thereof. The spring support member 125 is configured to interact with the main poppet 122 via a wire ring 126 disposed in an annular groove formed in the exterior peripheral surface of the proximal portion the main poppet 122. The wire ring 126 engages with an interior surface of the spring support member 125. With this configuration, a force that is applied to the spring support member 125 in the proximal direction is transferred to the main poppet 122 via the wire ring 126, and a force that is applied to the main poppet 122 in the distal direction is transferred to the spring support member 125 via the wire ring 126.

The valve 100 includes a check spring 128 disposed partially about an exterior peripheral surface of the spring support member 125. In particular, the check spring 128 has a distal end resting against the proximal end of the nose piece 109, whereas a proximal end of the check spring 128 rests against the spring support member 125. The nose piece 109 is fixedly disposed within the main sleeve 108, and thus the check spring 128 is configured to apply a biasing force on the main poppet 122 in the proximal direction via the spring support member 125 and the wire ring 126. The biasing force of the check spring 128 causes the main poppet 122 to be seated at the main poppet seat 124 when the valve 100 is unactuated to block fluid flow at the first port 110. Further, any pressurized fluid at the first port 110 also acts on the main poppet 122 in the proximal direction to help seat the main poppet 122 at the main poppet seat 124.

As depicted in FIG. 1, the spool 120 is partially hollow and defines therein a main cavity or main chamber 129. The valve 100 further includes a piston 130 disposed in the main chamber 129 of the spool 120. Particularly, the piston 130 has a proximal portion that is disposed in a channel 131 formed in a proximal portion of the spool 120, and the piston 130 has a distal portion that is fork-shaped. The valve 100 includes a spring 132 having a distal end resting against the proximal end of the nose piece 109, whereas a proximal end of the spring 132 rests against a shoulder formed on an interior peripheral surface of the fork-shaped portion of the piston 130. With this configuration, the spring 132 is configured to apply a biasing force on the piston 130 in the proximal direction. The spring 132 and the check spring 128 are disposed in a nested-spring configuration, where the spring 132 is disposed around the check spring 128.

Further, the spool 120 includes a channel or cross-hole 134 that is fluidly coupled to the pilot signal cross-hole 115 when the spool 120 is in the position shown in FIG. 1. Particularly, the main sleeve 108 has cross-holes, such as cross-holes 135A, 135B disposed in a radial or circumferential array about the main sleeve 108 and are fluid coupled to the pilot signal cross-hole 115 via an undercut or annular groove disposed in the exterior peripheral surface of the main sleeve 108. The cross-holes 135A, 135B are in turn fluidly coupled to the cross-hole 134 of the spool 120 when the spool 120 is in the position shown in FIG. 1. As such, fluid received at the third port 114 can be communicated through the pilot signal cross-hole 115, the cross-holes 135A, 135B, and the cross-hole 134 to the channel 131 that houses the proximal portion of the piston 130. With this configuration, the fluid received at the third port 114 can apply a fluid force on the piston 130 in the distal direction against the biasing force of the spring 132.

The meter-in valve portion 104 of the valve 100 includes a second poppet 136 disposed within the second sleeve 118. The second poppet 136 can also be referred to as a meter-in poppet.

In the closed position shown in FIG. 1, the second poppet 136 is seated on or at a poppet seat 138 formed by an interior peripheral surface of the second sleeve 118. Particularly, the second poppet 136 has a tapered circumferential surface that contacts the poppet seat 138 when the second poppet 136 is seated.

The second poppet 136 defines a respective longitudinal cylindrical cavity therein. A dart 140 is disposed in the longitudinal cylindrical cavity defined within the second poppet 136. In the closed position shown in FIG. 1, the dart 140 is seated on a dart seat 142 formed by an interior peripheral surface of the second poppet 136. The dart 140 has a respective tapered circumferential surface that contacts the dart seat 142 when the dart 140 is seated. Further, a chamber 144 is defined within the second poppet 136 between an exterior peripheral surface of the dart 140 and the interior peripheral surface of the second poppet 136.

The second poppet 136 further includes a pilot feed orifice 145. Fluid received at the fourth port 116 is communicated through the inlet flow cross-holes 117A, 117B and the cross-holes 119A, 119B to the pilot feed orifice 145, which then communicates the fluid to the chamber 144.

The dart 140 is configured to move axially in the longitudinal cylindrical cavity defined within the second poppet 136 when the valve 100 is actuated by any type of actuation mechanisms. As depicted in FIG. 1, the valve 100 includes a pull-type solenoid actuator configured to move the dart 140.

The pull-type solenoid actuator includes a solenoid tube 146 configured as a cylindrical housing or body disposed within and received at a proximal end of the housing 106. A solenoid coil 148 can be disposed about an exterior surface of the solenoid tube 146. The solenoid coil 148 is retained between a proximal end of the housing 106 and a coil nut 149 having internal threads that can engage a threaded region formed on the exterior peripheral surface of the solenoid tube 146 at its proximal end.

The solenoid tube 146 has a cylindrical body having therein a chamber 150 defined within a distal side of the solenoid tube 146. The solenoid tube 146 further includes a pole piece 152 composed of material of high magnetic permeability.

The solenoid tube 146 is configured to house a plunger or an armature 154 in the chamber 150. The armature 154 is slidably accommodated within the solenoid tube 146 (i.e., the armature 154 can move axially within the solenoid tube 146). The pole piece 152 is separated from the armature 154 by an airgap 156. The valve 100 further includes an armature spring 157 that applies a biasing force on the armature 154 in the distal direction, which is transferred to the dart 140 to help maintain the dart 140 in a seated position at the dart seat 142.

The armature 154 further includes an annular internal groove 158 on an interior peripheral surface of the armature 154, where the annular internal groove 158 is formed as a recessed portion configured to receive an enlarged proximal end 160 of the dart 140. With this configuration, the dart 140 is mechanically-coupled or linked to the armature 154, and thus axial motion of the armature 154 in the proximal direction causes the dart 140 to move therewith.

The valve 100 is configured to operate in two modes of operation. Particularly, the valve 100 can operate as: (i) a pilot-operated check valve configured to allow fluid received at the first port 110 to flow to the second port 112 (which can be fluidly coupled to a fluid reservoir) when a pilot fluid pressure signal is received at the third port 114, or (ii) a meter-in valve configured to allow fluid received at the fourth port 116 to be metered to the first port 110 when the solenoid coil 148 is energized.

Figure 2:
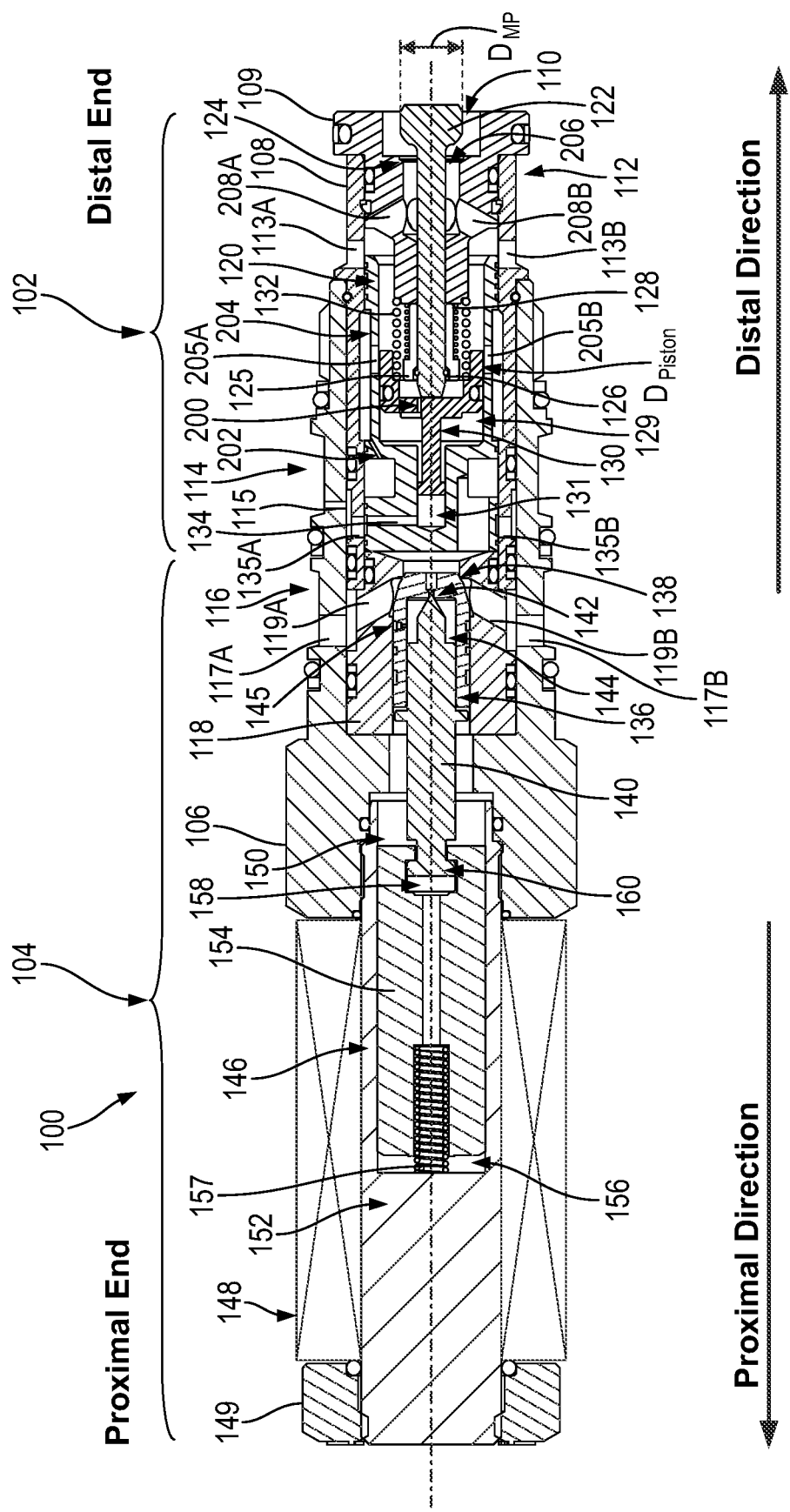
FIG. 2 illustrates a cross-sectional side view of the valve of FIG. 1 operating as a pilot-operated check valve, in accordance with an example implementation.

FIG. 2 illustrates a cross-sectional side view of the valve 100 operating as a pilot-operated check valve, in accordance with an example implementation. During operating in the pilot-operated check valve mode of operation, the solenoid coil 148 is not energized, and thus the dart 140 remains seated at the dart seat 142, and the second poppet 136 remains seated at the poppet seat 138, thereby blocking fluid received at the fourth port 116. The spool 120 is positioned in a first position depicted in FIG. 2 where the cross-hole is fluidly coupled to the pilot signal cross-hole 115.

Pressurized fluid received at the first port 110 applies a force in the proximal direction (e.g., to the left in FIG. 2) on the main poppet 122 toward the main poppet seat 124. Particularly, the pressurized fluid acts on an area of the main poppet 122 that is equal to the circular area of the distal end face of the main poppet 122. Assuming that a diameter of the end face of the main poppet 122 is $D_{MP}$ as labelled in FIG. 2, the area of the end face of the main poppet 122 is $$A_{MP} = \pi \frac{D_{MP}^2}{4}.$$

Further, the check spring 128 also applies a biasing force on the main poppet 122 in the proximal direction toward the main poppet seat 124. As such, the main poppet 122 can remain seated at the main poppet seat 124 until a force acting on the main poppet 122 in the distal direction overcomes the combined forces of the check spring 128 and the pressurized fluid at the first port 110 acting on the main poppet 122 in the proximal direction.

The pilot pressure fluid signal received at the third port 114 is communicated through the pilot signal cross-hole 115, the cross-holes 135A, 135B, and the cross-hole 134 to the channel 131 within the spool 120 where the proximal portion of the piston 130 is disposed. The pilot pressure fluid signal applies a force in the distal direction on the proximal portion of the piston 130 disposed in the channel 131 of the spool 120. The pilot pressure fluid signal is also communicated around the proximal portion of the piston 130 to the main chamber 129 formed within the spool 120 and acts on the forked-portion of the piston 130 in the distal direction. As such, the pilot pressure fluid signal applies a force on the piston 130 in the distal direction on an area having a diameter $D_{Piston}$ (labelled in FIG. 2) of the piston 130, i.e., an area equal to $$A_{Piston} = \pi \frac{D_{Piston}^2}{4}.$$

At the same time, the pilot pressure fluid signal communicated to the channel 131 applies a force on the spool 120 in the proximal direction toward the second sleeve 118 so as to maintain an overlap between the cross-hole 134 of the spool 120, and the cross-hole 135A of the main sleeve 108. Positioning the spool 120 in the axial position shown in FIG. 2 when the valve 100 is in the pilot-operated check valve mode of operation maintains providing the pilot pressure fluid signal to the channel 131. Also, in this axial position of the spool 120, the spool 120 does not block the return flow cross-holes 113A, 113B.

Further, the piston 130 has an orifice 200 and the spool 120 has another orifice 202. The pilot pressure fluid signal communicated to the main chamber 129, then through the return flow cross-holes 113A, 113B to the second port 112, which can be fluidly coupled to a reservoir.

Also, the pilot pressure fluid signal is communicated around an unsealed space between the exterior peripheral surface of the spool 120 and interior peripheral surface of the main sleeve 108, then through the orifice 202 to an annular space or annular chamber 204 formed between the exterior peripheral surface of the spool 120 and interior peripheral surface of the main sleeve 108. The spool 120 is further configured to have cross-holes 205A, 205B that fluidly couple the annular chamber 204 to the main chamber 129.

Thus, the pilot pressure fluid signal received at the third port 114 is communicated to the main chamber 129 through the orifices 200, 202, and then flows through the return flow cross-holes 113A, 113B to the second port 112. As such, a pilot fluid flow is generated from the third port 114 to the second port 112.

If the pilot pressure fluid signal has a pressure level that is sufficient to overcome the biasing force of the spring 132 on the piston 130, the piston 130 can move in the distal direction toward the main poppet 122. The piston 130 can then contact the main poppet 122 and applies a force thereto in the distal direction against fluid force of fluid at the first port 110 and against the biasing force of the check spring 128.

If the pressure level of the pilot pressure fluid signal is sufficiently high that the force the piston 130 applies on the main poppet 122 overcomes the fluid force of fluid at the first port 110 and the biasing force of the check spring 128 on the main poppet 122, the main poppet 122 can move axially in the distal direction off the main poppet seat 124. A pilot ratio determines the pressure level of the pilot pressure fluid signal that is sufficient to unseat the main poppet 122. As an example, a 3:1 pilot ratio indicates that a pressure level of the pilot pressure fluid signal that is 33% of pressure level of fluid at the first port 110 is sufficient to unseat the main poppet 122. With the configuration of the valve 100, the pilot ratio $P_R$ can be determined as $$P_R = \frac{A_{Piston}}{A_{MP}}.$$

The main poppet 122 can move axially in the distal direction until force equilibrium between the fluid force of the pilot pressure fluid signal acting in the distal direction on one hand, and the forces of fluid at the first port 110 and the biasing forces of the check spring 128 and the spring 132 on the other hand is reached. FIG. 2 illustrates the valve 100 with the main poppet 122 unseated off the main poppet seat 124, thereby causing a flow area 206 to be formed between the main poppet 122 and the nose piece 109. As depicted in FIGS. 1 and 2, the nose piece 109 can have a plurality of cross-holes, such as cross-holes 208A, 208B disposed in a radial or circumferential array about the nose piece 109. With this configuration, a flow path is formed and the fluid received at the first port 110 is allowed to flow through the flow area 206 to within the nose piece 109, then through the cross-holes 208A, 208B and the return flow cross-holes 113A, 113B to the second port 112, which can be fluidly coupled to a reservoir.

In addition to operating in a pilot-operated check valve mode of operation as described above with respect to FIG. 2, the valve 100 can also operate as a proportional fluid flow control or meter-in valve that meters fluid from the fourth port 116 to the first port 110.

Figure 3:
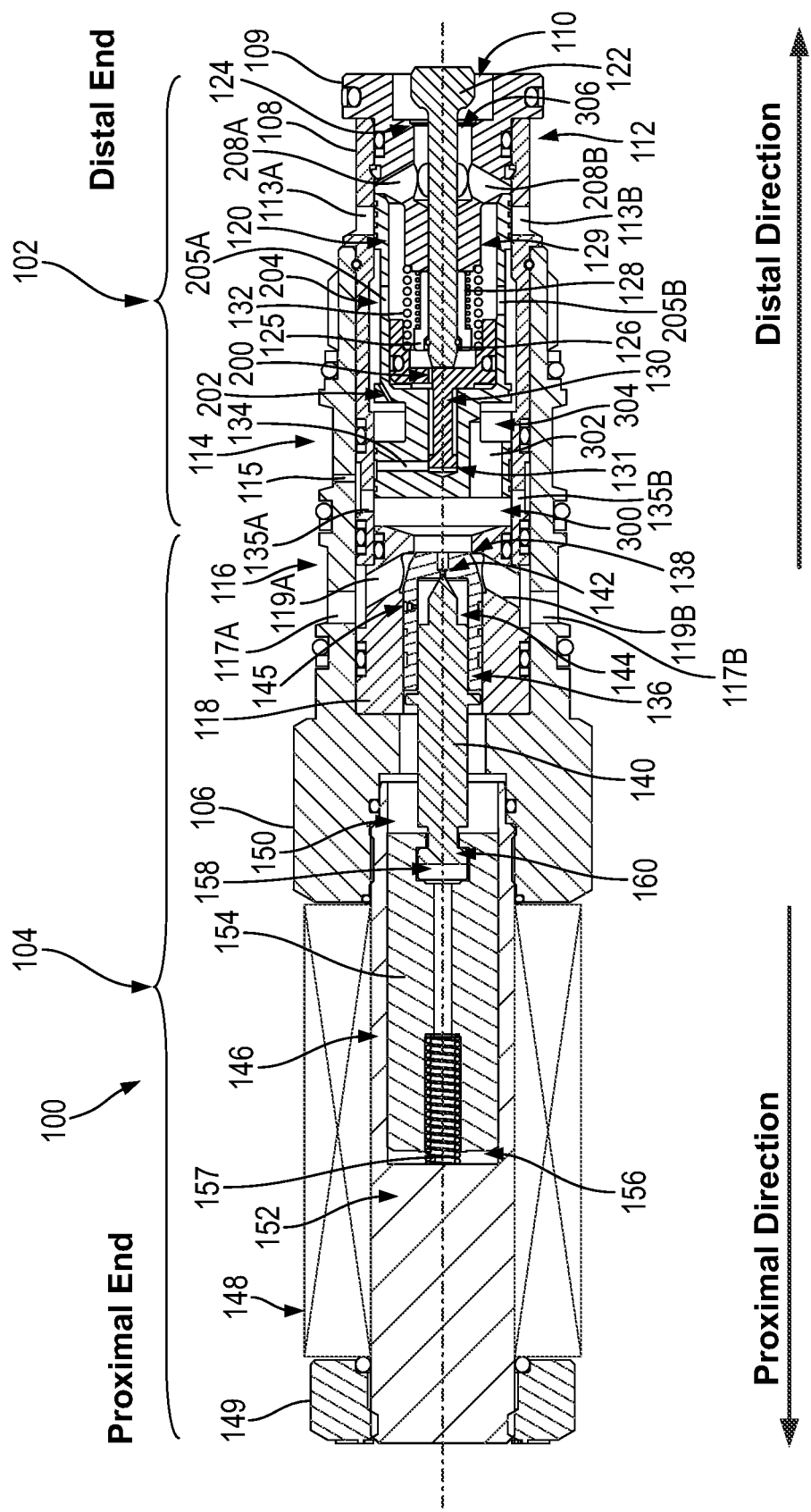
FIG. 3 illustrates a cross-sectional side view of a valve operating as a meter-in valve, in accordance with an example implementation.

FIG. 3 illustrates a cross-sectional side view of the valve 100 operating as a meter-in valve controlling fluid flow from the fourth port 116 to the first port 110, in accordance with an example implementation. When an electrical current is provided through the windings of the solenoid coil 148, a magnetic field is generated. The pole piece 152 directs the magnetic field through the airgap 156 toward the armature 154, which is movable and is attracted toward the pole piece 152. In other words, when an electrical current is applied to the solenoid coil 148, the generated magnetic field forms a north and south pole in the pole piece 152 and the armature 154. Thus, a solenoid force is generated to attract the pole piece 152 and the armature 154 toward each other.

Because the pole piece 152 is fixed and the armature 154 is movable, the armature 154 can traverse the airgap 156 toward the pole piece 152 when the solenoid force overcomes the biasing force of the armature spring 157. As such, the solenoid force is a pulling force that tends to pull the armature 154 in the proximal direction (to the left in FIG. 3). The solenoid force is proportional to a magnitude of the electrical command or signal (e.g., magnitude of electrical current or voltage applied to the solenoid coil 148).

As the armature 154 moves axially in the proximal direction, the dart 140 moves therewith due to engagement of the enlarged proximal end 160 of the dart 140 with the annular internal groove 158 of the armature 154. The dart 140 is thus unseated off the dart seat 142. As a result, fluid in the chamber 144 is allowed to flow around a nose of the dart 140 through the second poppet 136 to a chamber 300 formed between the second sleeve 118 and the spool 120. As a result of fluid flow out of the chamber 144 (i.e., as the fluid is vented from the chamber 144 to the chamber 300), the pressure level of fluid in the chamber 144 is reduced.

The fourth port 116 can be fluidly coupled to a source of pressurized fluid (e.g., a pump). The pressurized fluid received at the fourth port 116 flows through the inlet flow cross-holes 117A, 117B and the cross-holes 119A, 119B and applies a force on a tapered exterior peripheral surface of a nose or distal end of the second poppet 136. Because of the difference in pressure level between the fluid received at the fourth port 116 and the fluid in the chamber 144 (which has been reduced), the second poppet 136 is moved axially in the proximal direction (e.g., to the left in FIG. 3) to follow the dart 140, and is unseated off the poppet seat 138.

Thus, a gap or flow area is formed between the exterior surface of the second poppet 136 and the interior peripheral surface of the second sleeve 118, thus allowing fluid to flow from the fourth port 116 around the second poppet 136 to the chamber 300. The extent of axial motion of the dart 140 and the second poppet 136, and the size of the flow area are proportional to the magnitude of the command (e.g., magnitude of the electric current or voltage) provided to the solenoid coil 148. As such, fluid is metered through the valve 100 in proportion to the magnitude of the command.

Pressurized fluid communicated from the fourth port 116 to the chamber 300 then pushes the spool 120 in the distal direction to a second position shown in FIG. 3. As a result of the spool 120 moving axially in the distal direction, the spool 120 blocks the return flow cross-holes 113A, 113B to block fluid flow to the second port 112 and the reservoir coupled thereto.

Also, as the spool 120 moves in the distal direction, it can interact with the piston 130 and push the piston 130 in the distal direction. Further, fluid in the chamber 300 can flow through unsealed space between the spool 120 and the main sleeve 108, through the cross-hole 134 to the channel 131 to push the piston 130 in the distal direction as well. The piston 130 can then contact the main poppet 122 and move it in the distal direction.

The spool 120 is configured to have a longitudinal channel 302 and an annular groove 304. As a result of axial motion of the spool 120 in the distal direction, the annular groove 304 becomes fluidly coupled to the annular chamber 204. Thus, fluid in the chamber 300 received from the fourth port 116 is communicated through the longitudinal channel 302 and the annular groove 304 to the annular chamber 204.

The cross-holes 205A, 205B of the spool 120 fluidly couple the annular chamber 204 to the main chamber 129 as described above. Thus, fluid communicated from the fourth port 116 through the chamber 300, the longitudinal channel 302, and the annular groove 304 to the annular chamber 204 is further communicated through the cross-holes 205A, 205B to the main chamber 129. Fluid in the main chamber 129 can apply a fluid force on a proximal end face of the main poppet 122 to push the main poppet 122 in the distal direction.

Whether due to interaction of the piston 130 with the main poppet 122 or due to the fluid in the main chamber 129 applying a force on the main poppet 122, the main poppet 122 moves against the biasing force of the check spring 128 and is unseated off the main poppet seat 124, thereby causing a flow area 306 to be formed. As such, a flow path is formed and fluid can flow from the fourth port 116 through the inlet flow cross-holes 117A, 117B, the cross-holes 119A, 119B, around the second poppet 136 to the chamber 300, then through the longitudinal channel 302, the annular groove 304, the annular chamber 204, the cross-holes 205A, 205B, the main chamber 129, the cross-holes 208A, 208B of the nose piece 109, then through the flow area 306 to the first port 110, which can be fluidly coupled to a first chamber of a hydraulic actuator. Fluid flow from the fourth port 116 to the first port 110 can be referred to as meter-in flow.

Fluid exiting from a second chamber of the hydraulic actuator can be provided to a pilot-operated check valve to allow the fluid exiting the second chamber to flow to the reservoir. To actuate such pilot-operated check valve, the fluid in the chamber 300 of the valve 100 flows through cross-holes 135A, 135B disposed in the main sleeve 108, then through the pilot signal cross-hole 115 to the third port 114. The third port 114 can be fluidly coupled to a pilot port of the pilot-operated check valve to provide a pilot signal thereto and actuate the pilot-operated check valve. In examples, the pilot-operated check valve can be another valve 100 disposed on the other side of the hydraulic actuator and operating in the pilot-operated check valve mode described above with respect to FIG. 2.

Once the solenoid coil 148 is de-energized, the armature spring 157 can push the armature 154, the dart 140, and the second poppet 136 in the distal direction, thereby causing the second poppet 136 to be re-seated at the poppet seat 138 blocking fluid flow from the fourth port 116 to the chamber 300. The spring 132 can then push the piston 130 back in the proximal direction, whereas the check spring 128 can push the main poppet 122 back to be re-seated at the main poppet seat 124, blocking fluid flow to and from the first port 110.

Fluid in the channel 131 (e.g., fluid received at the third port 114 and communicated to the channel 131) can push the spool 120 back to the position shown in FIGS. 1 and 2 where the spool 120 interfaces with the second sleeve 118.

Thus, the valve 100 can be used as both a meter-in valve and a pilot-operated check valve in various hydraulic systems.

Figure 4:
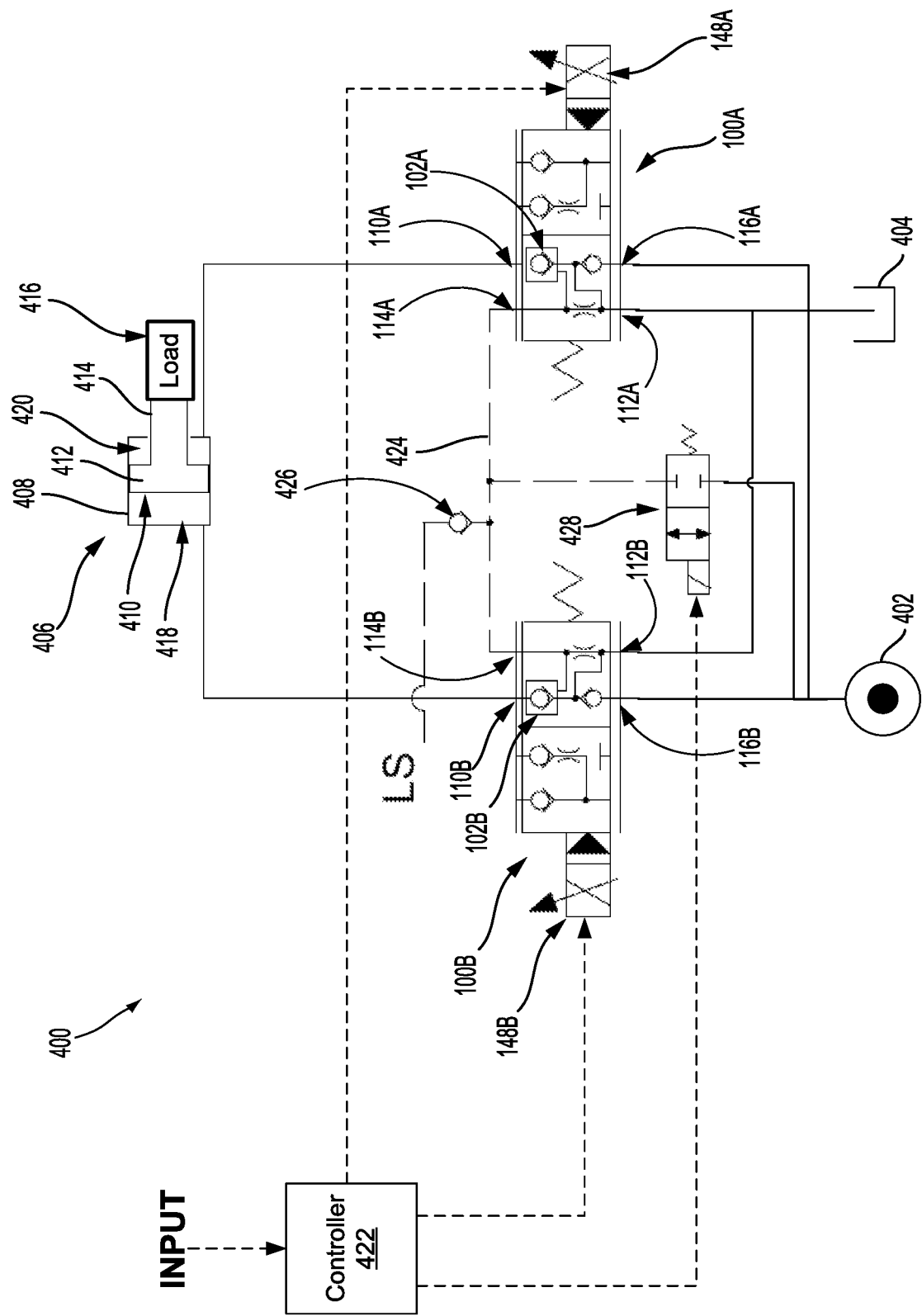
FIG. 4 illustrates a hydraulic system, in accordance with an example implementation.

FIG. 4 illustrates a hydraulic system 400, in accordance with an example implementation. The hydraulic system 400 includes two valves 100A, 100B that each symbolically represents the valve 100. The valves 100A, 100B have the same components of the valve 100. Therefore, the components or elements of the valves 100A, 100B are designated with the same reference numbers used for the valve 100 with an "A" or "B" suffix to correspond to the valves 100A, 100B respectively.

As symbolically represented in FIG. 4, the valve 100A is configured to operate in the pilot-operated check valve mode of operation described above with respect to FIG. 2 when the solenoid coil 148A is not energized, and configured to operate in the meter-in valve mode of operation described above with respect to FIG. 3 when the solenoid coil 148A is energized. Similarly, the valve 100B is configured to operate in the pilot-operated check valve mode of operation described above with respect to FIG. 2 when the solenoid coil 148B is not energized, and configured to operate in the meter-in valve mode of operation described above with respect to FIG. 3 when the solenoid coil 148B is energized.

The hydraulic system 400 includes a source 402 of fluid. The source 402 of fluid can, for example, be a pump configured to provide fluid to the ports 116A, 116B of the valves 100A, 100B. Such pump can be a fixed displacement pump, a variable displacement pump, or a load-sensing variable displacement pump, as examples. Additionally or alternatively, the source 402 of fluid can be an accumulator.

The hydraulic system 400 also includes a reservoir 404 of fluid that can store fluid at a low pressure (e.g., 0-70 psi). The second ports 112A, 112B of the valves 100A, 100B are respectively fluidly coupled to the reservoir 404. In examples, the source 402 of fluid can be configured to receive fluid from the reservoir 404, pressurize the fluid, then provide pressurized fluid to the ports 116A, 116B of the valves 100A, 100B, respectively.

The valves 100A, 100B operate as meter-in valves and pilot-operated check valves to control fluid flow to and from an actuator 406. The actuator 406 includes a cylinder 408 and a piston 410 slidably accommodated in the cylinder 408. The piston 410 includes a piston head 412 and a rod 414 extending from the piston head 412 along a central longitudinal axis direction of the cylinder 408. The rod 414 is coupled to a load 416 and the piston head 412 divides the inside space of the cylinder 408 into a first chamber 418 and a second chamber 420. As shown in FIG. 4, the port 110A of the valve 100A is fluidly coupled to the second chamber 420 of the actuator 406, whereas the port 110B of the valve 100B is fluidly coupled to the first chamber 418 of the actuator 406.

The hydraulic system 400 can further include a controller 422. The controller 422 can include one or more processors or microprocessors and may include data storage (e.g., memory, transitory computer-readable medium, non-transitory computer-readable medium, etc.). The data storage may have stored thereon instructions that, when executed by the one or more processors of the controller 422, cause the controller 422 to perform operations described herein. Signal lines to and from the controller 422 are depicted as dashed lines in FIG. 4.

The controller 422 can receive input or input information comprising sensor information via signals from various sensors or input devices in the hydraulic system 400 and in response provide electrical signals to various components of the hydraulic system 400. For example, the controller 422 can receive a command or an input (e.g., from a joystick of a machine) to move the piston 410 in a given direction at a particular desired speed (e.g., to extend or retract the piston 410). The controller 422 can then provide a signal to the valve 100A or the valve 100B to move the piston 410 in the commanded direction and at a desired commanded speed in a controlled manner.

For example, to extend the piston 410 (i.e., move the piston 410 to the right in FIG. 4), the controller 422 can send a command signal to the solenoid coil 148B to operate the valve 100B as a meter-in valve as described above with respect to FIG. 3. As a result, fluid is provided from the source 402 to the port 116B of the valve 100B, metered through the valve 100B, and then provided to the port 110B of the valve 100B. Fluid then flows to the first chamber 418 of the actuator 406 to extend the piston 410. In addition to fluid being metered through the valve 100B as it flows from the port 116B to the port 110B, a pilot pressure fluid signal is provided from the port 116B to the port 114B. The port 114B of the valve 100B is fluidly coupled through a pilot line 424 to the port 114A of the valve 100A.

As the piston 410 extends, fluid is forced out of the second chamber 420 and is provided to the port 110A of the valve 100A. The valve 100A is configured to hold the load 416, i.e., preclude the piston 410 from moving, until a pilot pressure fluid signal having a predetermined pressure level (based on the pilot ratio of the valve 100A) is received at the port 114A. Such pilot pressure fluid signal provided to the port 114A of the valve 100A through the pilot line 424 causes the valve 100A to operate as a pilot-operated check valve. In other words, the pilot pressure fluid signal provided to the port 114A can actuate the pilot-operated check valve portion 102A of the valve 100A as described above with respect to FIG. 2 to allow fluid provided to the port 110A from the second chamber 420 to flow to the port 112A, which is fluidly coupled to the reservoir 404. As such, the piston 410 can extend at a speed that is based on the magnitude of the command signal provided to the solenoid coil 148B.

To retract the piston 410 (i.e., move the piston 410 to the left in FIG. 4), the controller 422 can send a command signal to the solenoid coil 148A to operate the valve 100A as a meter-in valve as described above with respect to FIG. 3. As a result, fluid is provided from the source 402 to the port 116A of the valve 100A, metered through the valve 100A, and then provided to the port 110A of the valve 100A. Fluid then flows to the second chamber 420 of the actuator 406 to retract the piston 410. In addition to fluid being metered through the valve 100A as it flows from the port 116A to the port 110A, a pilot pressure fluid signal is provided from the port 116A to the port 114A. The port 114A of the valve 100A is fluidly coupled through the pilot line 424 to the port 114B of the valve 100B.

As the piston 410 retracts, fluid is forced out of the first chamber 418 and is provided to the port 110B of the valve 100B. The valve 100B is configured to hold the load 416, i.e., preclude the piston 410 from moving, until a pilot pressure fluid signal having a predetermined pressure level (based on the pilot ratio of the valve 100B) is received at the port 114B. Such pilot pressure fluid signal provided to the port 114B of the valve 100B through the pilot line 424 causes the valve 100B to operate as a pilot-operated check valve. In other words, the pilot pressure fluid signal provided to the port 114B can actuate the pilot-operated check valve portion 102B of the valve 100B as described above with respect to FIG. 2 to allow fluid provided to the port 110B from the first chamber 418 to flow to the port 112B, which is fluidly coupled to the reservoir 404. As such, the piston 410 retracts at a speed that is based on the magnitude of the command signal provided to the solenoid coil 148A.

Whether the piston 410 is extending or retracting, return flow is provided through the respective pilot-operated check valve portion of the respective valve 100A, 100B directly to the reservoir 404. This contrasts with conventional systems configured to provide return fluid exiting a pilot-operated check valve through the meter-in directional valve, which can lead to a pressure drop and energy loss as return fluid flows through the directional valve on the way to a reservoir. The configuration of FIG. 4 can thus be more efficient than such conventional systems.

In examples, the source 402 can be configured as a load-sensing variable displacement pump (LS pump). An LS pump is configured to receive a load-sense (LS) pressure signal indicative of how large the load 416 is and provide enough flow at the pressure level of the LS pressure signal plus a margin pressure value. This flow is then communicated to one of the valves 100A, 100B to provide the flow the actuator 406 and move the load 416.

In conventional LS systems, each of the two hydraulic lines connected to the first chamber 418 and the second chamber 420 are connected via respective check valves to an LS line that is connected to an LS port of the LS pump. In contrast to such conventional configurations, the hydraulic system 400 can have one load-sense check valve 426 that is fluidly coupled to the pilot line 424 and configured to provide an LS pressure signal to an LS port of the source 402 (when the source 402 is an LS pump). Using one check valve rather than two can reduce cost of the system.

Further, the LS check valve 426 provides to the source 402 the pilot pressure fluid signal provided to the pilot line 424. The pilot pressure fluid signal provided to the pilot line 424 is provided from whichever valve of the valves 100A, 100B is actuated by a command signal from the controller 422. Because one of the valves 100A, 100B is actuated at a time to provide meter-in flow to the actuator 406, whereas the other valve is not actuated, the pilot line 424 is provided with the pressure signal indicative of pressure level in the meter-in line. This configuration in FIG. 4 can thus avoid providing the signal in the return line when there is fluid trapped therein having a higher pressure level than meter-in fluid being supplied to the actuator 406.

When neither the solenoid coil 148A nor the solenoid coil 148B is energized, both valves 100A, 100B hold the load 416 and preclude the piston 410 from moving because no pilot pressure fluid signal is received at either of the ports 114A, 114B, and thus fluid at the ports 110A, 110B is blocked and does not flow to the ports 112A, 112B. It may be desirable in some cases to actuate both pilot-operated check valve portions 102A, 102B to unload both chambers 418, 420 to the reservoir 404.

In these cases, the hydraulic system 400 can further include an electronically-controlled valve 428. In an example, the electronically-controlled valve 428 can be configured as an on/off valve. The electronically-controlled valve 428 can have an inlet port fluidly coupled to the source 402 and an outlet port fluidly coupled to the pilot line 424 as depicted in FIG. 4. With this configuration, when the controller 422 provides a command signal to a solenoid coil of the electronically-controlled valve 428, the electronically-controlled valve 428 opens and provides a pressurized fluid signal to the pilot line 424 thereby actuating both pilot-operated check valve portions 102A, 102B at the same time.

This configuration is advantageous over conventional systems that have separate pilot signals provided to respective pilot-operated check valves. In such conventional systems, two pressurized fluid signals are provided to actuate both pilot-operated check valves rather than one pressurized fluid signal as in the hydraulic system 400. Further, in some conventional systems, as mentioned above, fluid exiting a pilot-operated check valve flows through a directional meter-in valve prior to flowing to a reservoir. Thus, in such conventional systems, the directional meter-in valve is actuated by a command signal to open a fluid path to the reservoir. In the hydraulic system 400, the solenoid coils 148A, 148B need not be actuated by additional command signals when the pilot-operated check valve portions 102A, 102B are actuated, thereby reducing complexity of the hydraulic system 400 compared to conventional systems.

Figure 5:
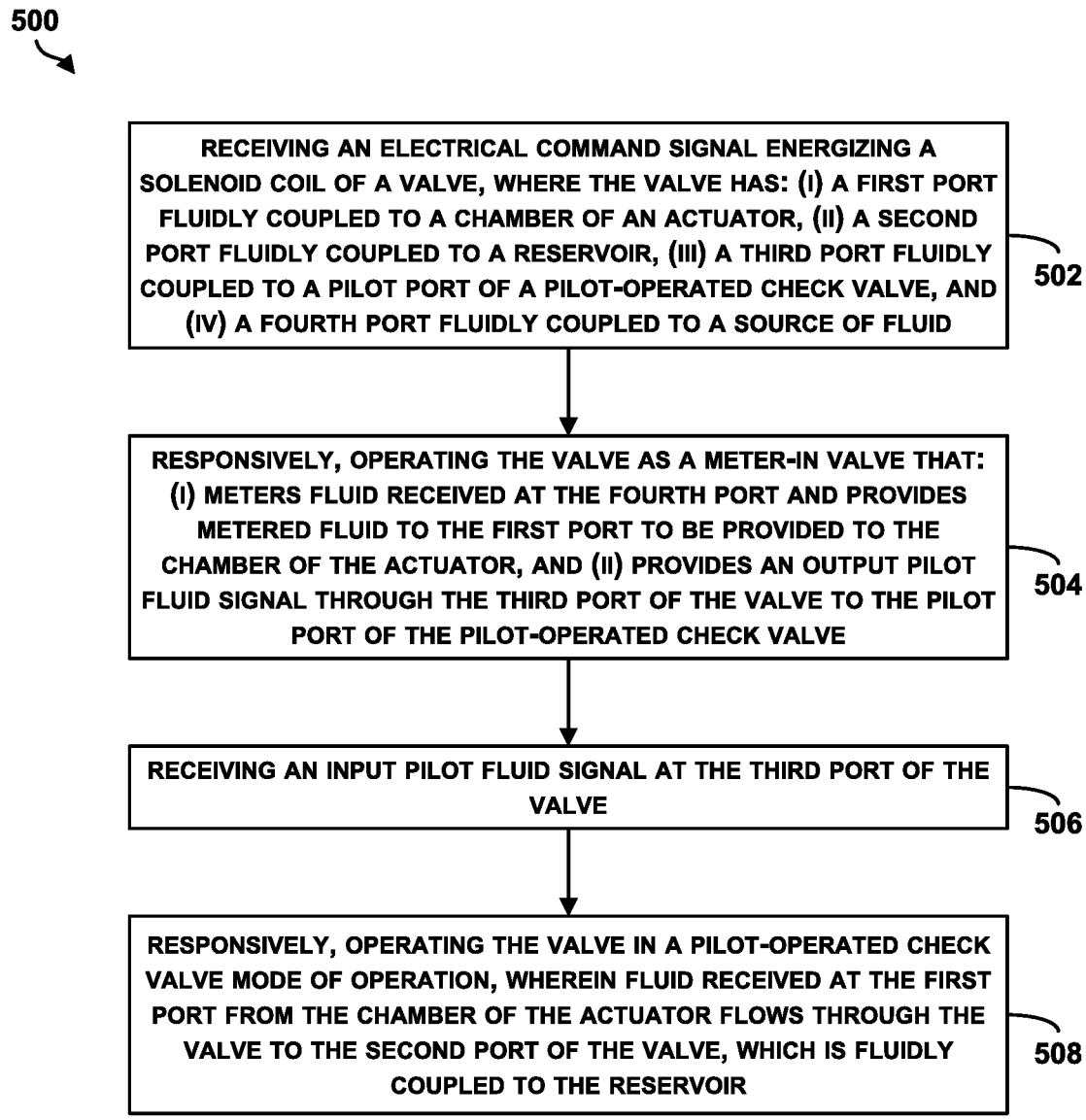
FIG. 5 is a flowchart of a method for operating a valve, in accordance with an example implementation.

FIG. 5 is a flowchart of a method 500 for operating a valve, in accordance with an example implementation. The method 500 shown in FIG. 5 presents an example of a method that can be used with the valve 100 (e.g., the valves 100A, 100B) shown throughout the Figures, for example. The method 500 may include one or more operations, functions, or actions as illustrated by one or more of blocks 502-508. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes receiving an electrical command signal (e.g., from the controller 422) energizing the solenoid coil 148 of the valve 100, where the valve 100 has: (i) the first port 110 fluidly coupled to a chamber (e.g., the second chamber 420) of an actuator (e.g., the actuator 406), (ii) the second port 112 fluidly coupled to a reservoir (e.g., the reservoir 404), (iii) the third port 114 fluidly coupled to a pilot port of a pilot-operated check valve, and (iv) the fourth port 116 fluidly coupled to a source of fluid (e.g., the source 402).

At block 504, the method 500 includes, responsively, operating the valve 100 as a meter-in valve that: (i) meters fluid received at the fourth port 116 and provides metered fluid to the first port 110 to be provided to the chamber of the actuator, and (ii) provides an output pilot fluid signal through the third port 114 of the valve 100 to the pilot port of the pilot-operated check valve.

At block 506, the method 500 includes receiving an input pilot fluid signal at the third port 114 of the valve 100.

At block 508, the method 500 includes, responsively, operating the valve 100 in a pilot-operated check valve mode of operation, wherein fluid received at the first port 110 from the chamber of the actuator flows through the valve 100 to the second port 112 of the valve 100, which is fluidly coupled to the reservoir.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
 a plurality of ports comprising: (i) a first port configured to be fluidly coupled to a hydraulic actuator, (ii) a second port configured to be fluidly coupled to a reservoir, (iii) a third port configured to provide an output pilot fluid signal and receive an input pilot fluid signal, and (iv) a fourth port configured to be fluidly coupled to a source of fluid;
 a main poppet configured to be subjected to a first fluid force of fluid received at the first port acting on the main poppet in a proximal direction to cause the main poppet to be seated at a main poppet seat to block fluid flow to and from the first port;

a piston configured to move axially to contact the main poppet; and a spool that is axially movable between a first position and a second position, wherein the valve is configured to operate in two modes of operation: (i) a pilot-operated check valve mode of operation in which the spool is in the first position that allows the input pilot fluid signal to apply a second fluid force on the piston in a distal direction opposite the proximal direction, thereby causing the piston to unseat the main poppet off the main poppet seat to fluidly couple the first port to the second port, and (ii) a proportional flow control mode of operation in which the spool is subjected to fluid received at the fourth port to move the spool to the second position at which the spool blocks the second port and the main poppet is unseated off the main poppet seat, thereby causing the fourth port to be fluidly coupled to: (a) the first port to provide fluid flow thereto, and (b) the third port to provide the output pilot fluid signal to be communicated externally.

2. The valve of claim 1, further comprising:
a main sleeve comprising the second port;
a housing having a cylindrical cavity in which the main sleeve is at least partially disposed, wherein the housing comprises the third port and the fourth port; and
a nose piece disposed at least partially in the main sleeve, wherein the nose piece comprises the first port and forms the main poppet seat on an interior surface of the nose piece.

3. The valve of claim 2, wherein the nose piece further comprises a plurality of cross-holes disposed in a circumferential array about the nose piece and configured to fluidly couple (i) the first port to the second port when the spool is in the first position and the main poppet is unseated off the main poppet seat, and (ii) the fourth port to the first port when the spool is in the first position and the main poppet is unseated off the main poppet seat.

4. The valve of claim 1, wherein the spool comprises:
a cross-hole configured to be fluidly coupled to the third port when the spool is in the first position and a channel that is fluidly coupled to the cross-hole and configured to receive a portion of the piston therein, such that the input pilot fluid signal is communicated from the third port through the cross-hole to the channel to apply the second fluid force on the piston in the distal direction.

5. The valve of claim 1, further comprising:
a first spring configured to apply a biasing force on the main poppet in the proximal direction; and
a second spring configured to apply a respective biasing force on the piston in the proximal direction.

6. The valve of claim 1, further comprising:
a second poppet configured to block fluid flow from the fourth port when the second poppet is seated at a poppet seat, wherein the second poppet is configured to be subjected to a third fluid force of fluid received at the fourth port acting on the second poppet in the proximal direction;
a dart disposed, at least partially, within the second poppet, wherein the dart is configured to be seated on a dart seat formed on an interior surface of the second poppet, and wherein the dart is configured to move axially within the second poppet; and
a solenoid actuator having an armature coupled to the dart such that axial motion of the armature causes the dart to move axially off the dart seat, thereby causing the third fluid force to move the second poppet to follow the dart and allow fluid received at the fourth port to push the spool toward the second position.

7. The valve of claim 6, further comprising:
a solenoid coil; and
a pole piece, wherein when the valve is in the pilot-operated check valve mode of operation, the solenoid coil is de-energized and the second poppet blocks the fourth port, and wherein when the solenoid coil is energized, a solenoid force is applied to the armature and the dart coupled thereto, thereby causing the armature and the dart to move axially in the proximal direction toward the pole piece to operate the valve in the proportional flow control mode of operation.

8. The valve of claim 6, further comprising:
a sleeve disposed adjacent to the spool, wherein the sleeve has a cylindrical cavity in which the second poppet is axially movable and wherein the sleeve forms the poppet seat on a respective interior surface.

9. The valve of claim 6, wherein the second poppet includes a pilot feed orifice configured to fluidly couple the fourth port to a chamber formed within the second poppet, wherein pressurized fluid from the fourth port is communicated to the chamber through the pilot feed orifice, and wherein when the dart is unseated off the dart seat, fluid in the chamber is allowed to flow out of the chamber thereby reducing pressure level therein and allowing the second poppet to be unseated off the poppet seat by pressurized fluid of the fourth port.

10. A hydraulic system comprising:
a source of fluid;
a reservoir;
an actuator having a first chamber and a second chamber therein;
a pilot-operated check valve comprising: (i) a load port fluidly coupled to the second chamber of the actuator, and (ii) a pilot port, wherein the pilot-operated check valve is configured to allow fluid flow from the load port to the reservoir when a pilot fluid signal is received at the pilot port; and
a valve comprising: (i) a first port fluidly coupled to the first chamber of the actuator, (ii) a second port fluidly coupled to the reservoir, (iii) a third port configured to provide an output pilot fluid signal to the pilot port of the pilot-operated check valve and receive an input pilot fluid signal, and (iv) a fourth port fluidly coupled to the source of fluid, and wherein the valve further comprises:
a main poppet configured to be subjected to a first fluid force of fluid received at the first port acting on the main poppet in a proximal direction to cause the main poppet to be seated at a main poppet seat to block fluid flow to and from the first port,
a piston configured to move axially to contact the main poppet, and
a spool that is axially movable between a first position and a second position,
wherein the valve is configured to operate in two modes of operation: (i) a pilot-operated check valve mode of operation in which the spool is in the first position that allows the input pilot fluid signal to apply a second fluid force on the piston in a distal direction opposite the proximal direction, thereby causing the piston to unseat the main poppet off the main poppet seat to fluidly couple the first port to the second port, and (ii) a proportional flow control mode of operation in which the spool is subjected to fluid received at the fourth port to move the spool to the second position at which the spool blocks the second port and the main poppet is unseated off the main poppet seat, thereby causing the fourth port to be fluidly coupled to: (a) the first port to provide fluid flow to the first chamber of the actuator, and (b) the third port to provide the output pilot fluid signal to be communicated to the pilot port of the pilot-operated check valve to actuate the pilot-operated check valve and allow fluid to flow from the second chamber to the reservoir.

11. The hydraulic system of claim 10, wherein the valve further comprises:
a main sleeve comprising the second port;
a housing having a cylindrical cavity in which the main sleeve is at least partially disposed, wherein the housing comprises the third port and the fourth port; and
a nose piece disposed at least partially in the main sleeve, wherein the nose piece comprises the first port and forms the main poppet seat on an interior surface of the nose piece.

12. The hydraulic system of claim 11, wherein the nose piece further comprises a plurality of cross-holes disposed in a circumferential array about the nose piece and configured to fluidly couple (i) the first port to the second port when the spool is in the first position and the main poppet is unseated off the main poppet seat, and (ii) the fourth port to the first port when the spool is in the first position and the main poppet is unseated off the main poppet seat.

13. The hydraulic system of claim 10, wherein the spool comprises:
a cross-hole configured to be fluidly coupled to the third port when the spool is in the first position and a channel that is fluidly coupled to the cross-hole and configured to receive a portion of the piston therein, such that the input pilot fluid signal is communicated from the third port through the cross-hole to the channel to apply the second fluid force on the piston in the distal direction.

14. The hydraulic system of claim 10, wherein the valve further comprises:
a first spring configured to apply a biasing force on the main poppet in the proximal direction; and
a second spring configured to apply a respective biasing force on the piston in the proximal direction.

15. The hydraulic system of claim 10, wherein the valve further comprises:
a second poppet configured to block fluid flow from the fourth port when the second poppet is seated at a poppet seat, wherein the second poppet is configured to be subjected to a third fluid force of fluid received at the fourth port acting on the second poppet in the proximal direction;
a dart disposed, at least partially, within the second poppet, wherein the dart is configured to be seated on a dart seat formed on an interior surface of the second poppet, and wherein the dart is configured to move axially within the second poppet; and
a solenoid actuator having an armature coupled to the dart such that axial motion of the armature causes the dart to move axially off the dart seat, thereby causing the third fluid force to move the second poppet to follow the dart and allow fluid received at the fourth port to push the spool toward the second position.

16. The hydraulic system of claim 15, wherein the valve further comprises:
a solenoid coil; and a pole piece, wherein when the valve is in the pilot-operated check valve mode of operation, the solenoid coil is de-energized and the second poppet blocks the fourth port, and wherein when the solenoid coil is energized, a solenoid force is applied to the armature and the dart coupled thereto, thereby causing the armature and the dart to move axially in the proximal direction toward the pole piece to operate the valve in the proportional flow control mode of operation.

17. The hydraulic system of claim 15, wherein the valve further comprises:
a sleeve disposed adjacent to the spool, wherein the sleeve has a cylindrical cavity in which the second poppet is axially movable and wherein the sleeve forms the poppet seat on a respective interior surface.

18. The hydraulic system of claim 15, wherein the second poppet includes a pilot feed orifice configured to fluidly couple the fourth port to a chamber formed within the second poppet, wherein pressurized fluid from the fourth port is communicated to the chamber through the pilot feed orifice, and wherein when the dart is unseated off the dart seat, fluid in the chamber is allowed to flow out of the chamber thereby reducing pressure level therein and allowing the second poppet to be unseated off the poppet seat by pressurized fluid of the fourth port.

19. A method comprising:
receiving an electrical command signal energizing a solenoid coil of a valve, wherein the valve comprises: (i) a first port fluidly coupled to a chamber of an actuator, (ii) a second port fluidly coupled to a reservoir, (iii) a third port fluidly coupled to a pilot port of a pilot-operated check valve, (iv) a fourth port fluidly coupled to a source of fluid, and (v) a spool that is axially movable between a first position and a second position;
responsively, causing the spool to move from the first position to the second position to operate the valve as a meter-in valve that: (i) meters fluid received at the fourth port and provides metered fluid to the first port to be provided to the chamber of the actuator, and (ii) provides an output pilot fluid signal through the third port of the valve to the pilot port of the pilot-operated check valve;
receiving an input pilot fluid signal at the third port of the valve while the spool is in the first position; and
responsively, operating the valve as in a pilot-operated check valve mode of operation, wherein fluid received at the first port from the chamber of the actuator flows through the valve to the second port of the valve, which is fluidly coupled to the reservoir.

20. The method of claim 19, wherein the valve further comprises: (i) a poppet configured to be subjected to a fluid force of fluid received at the fourth port acting on the poppet in a proximal direction, (ii) a dart disposed, at least partially, within the poppet, wherein the dart is configured to be seated on a dart seat formed on an interior surface of the poppet, and wherein the dart is configured to move axially within the poppet, (iii) and a solenoid actuator having an armature coupled to the dart, wherein causing the spool to move from the first position to the second position comprises:
applying a solenoid force on the armature and the dart coupled thereto, thereby (i) causing the dart to move axially off the dart seat, and (ii) causing the fluid force to move the poppet to follow the dart and allow the fluid received at the fourth port to push the spool toward the second position.

\* \* \* \* \*